Figure 1:
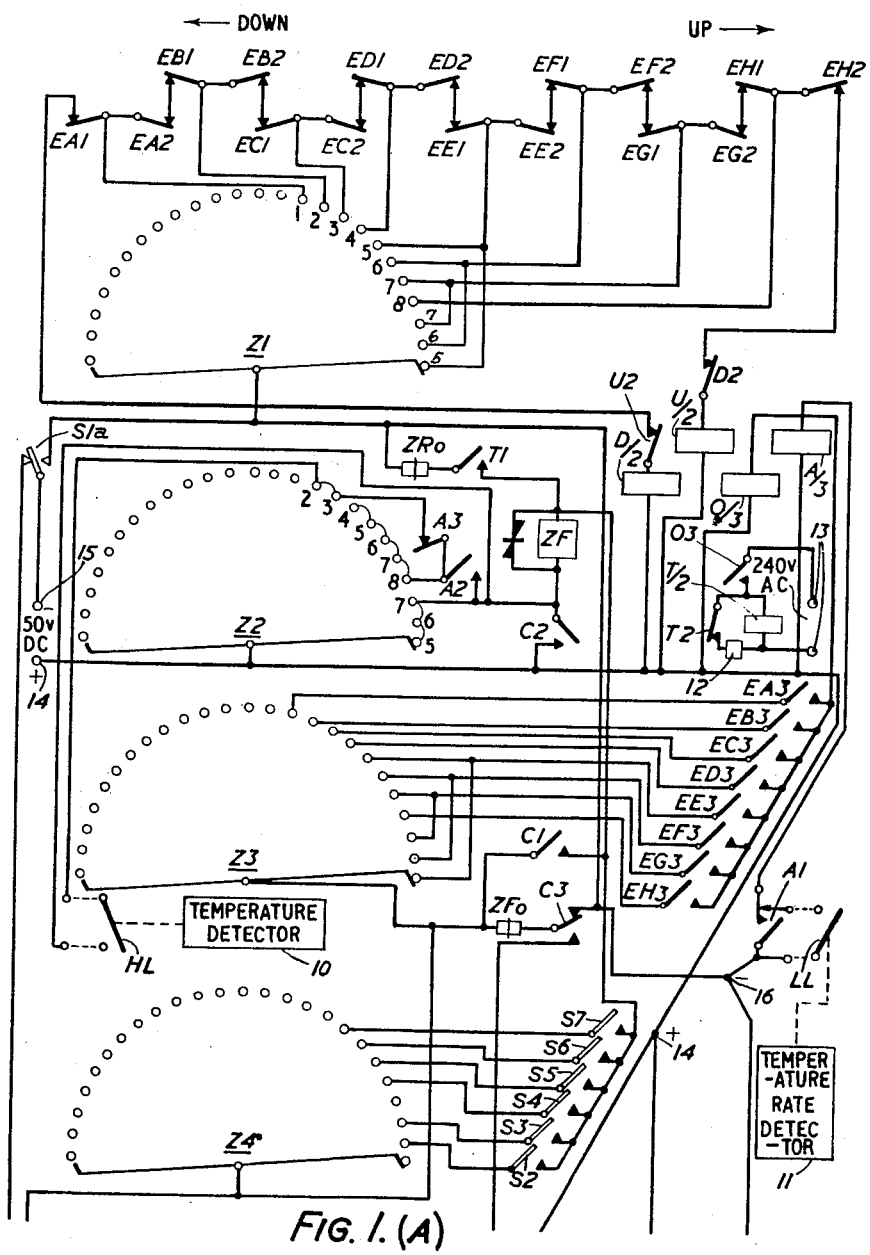

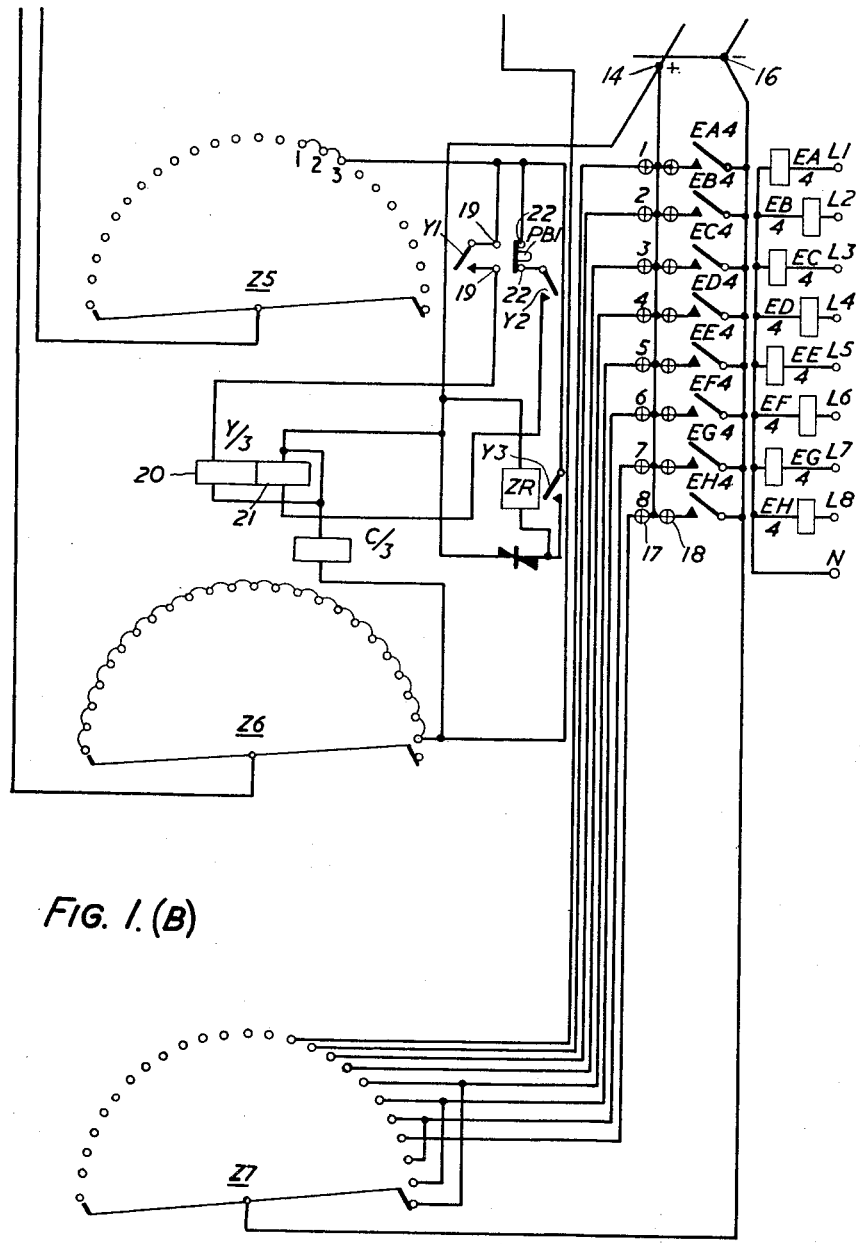

July 10, 1962

J. RAVENSCROFT 3,043,894

ELECTRIC ARC FURNACES

Filed Dec. 3, 1958

5 Sheets-Sheet 3

INVENTOR
JACK RAVENSCROFT

BY Kane and Nydick

ATTORNEYS

INVENTOR
JACK RAVENSCROFT

United States Patent Office 3,043,894
Patented July 10, 1962

3,043,894
ELECTRIC ARC FURNACES
Jack Ravenscroft, Manchester, England, assignor to The British Iron and Steel Research Association, London, England
Filed Dec. 3, 1958, Ser. No. 778,027
Claims priority, application Great Britain May 16, 1958
18 Claims. (Cl. 13—12)

This invention relates to electric furnaces and is particularly concerned with control circuits for controlling the operation of such furnaces, particularly electric arc furnaces and furnaces with multiple voltage tappings, because long arcs in the arc furnace are detrimental to the furnace lining and roof unless shielded by the charge, care has to be taken during the melting period to reduce the electrical power input at the right time to protect the refractories. For a given current the arc length increases with the voltage so that the voltage that can be used at a particular time is influenced by the nature and condition of the furnace refractories.

An object of the invention is to provide a control circuit for automatically altering the power to an electric furnace under prescribed conditions.

A control system for an electric furnace includes, according to the present invention, a heat sensitive device automatically controlling a regulator tending to regulate the generation of heat in the furnace.

In accordance with a preferred form of the invention, the system for controlling an electric arc furnace comprises a heat sensitive device sensitive to the temperature of, and/or the rate of heat received by the furnace refractory lining, and a regulator operated by the heat sensitive device when the temperature reaches a given level to alter the power input to the furnace electrodes to a required value.

In one form of the invention the system comprises a multi-position switch, a heat sensitive device, a control circuit for the electric input to the arcs and a timing device, arranged and connected so that at the initiation of the melt, the power input is automatically progressively increased in steps at intervals determined by the timing device; towards the end of the melting period, when the temperature or rate of heat falling on the refractories has reached a first predetermined value, the power input is automatically progressively decreased in steps; and, during the refining period, when the temperature has reached a second predetermined value, the power input is again progressively decreased.

In some furnaces, when using low density scrap, the charge has to be added in more than one portion and in this case the first two stages of the control action may be repeated for each melting operation.

Figure 2:
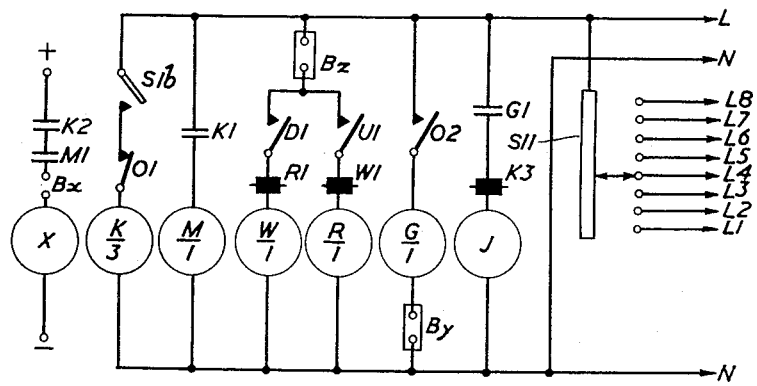
Figure 3:
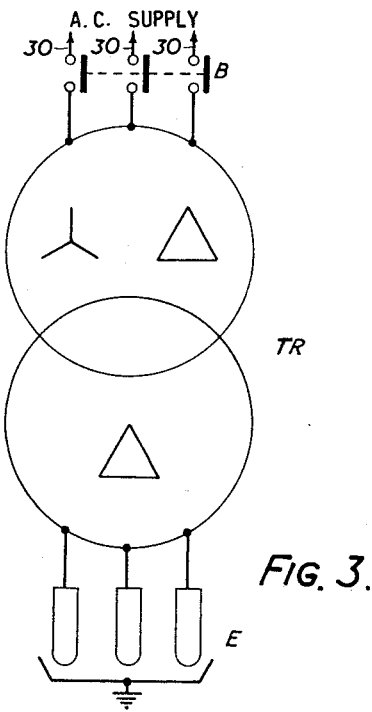

The invention will be more readily understood by way of example from the following description of a control system for an electric arc furnace in accordance therewith, reference being made to the accompanying drawings in which:

FIGURES 1A and 1B taken together form a circuit diagram of the control system,

FIGURE 2 illustrates the contactors controlling the supply of current to the electrodes, and FIGURE 3 shows the circuit breaker, furnace transformer and the electrodes.

Figure 4A:
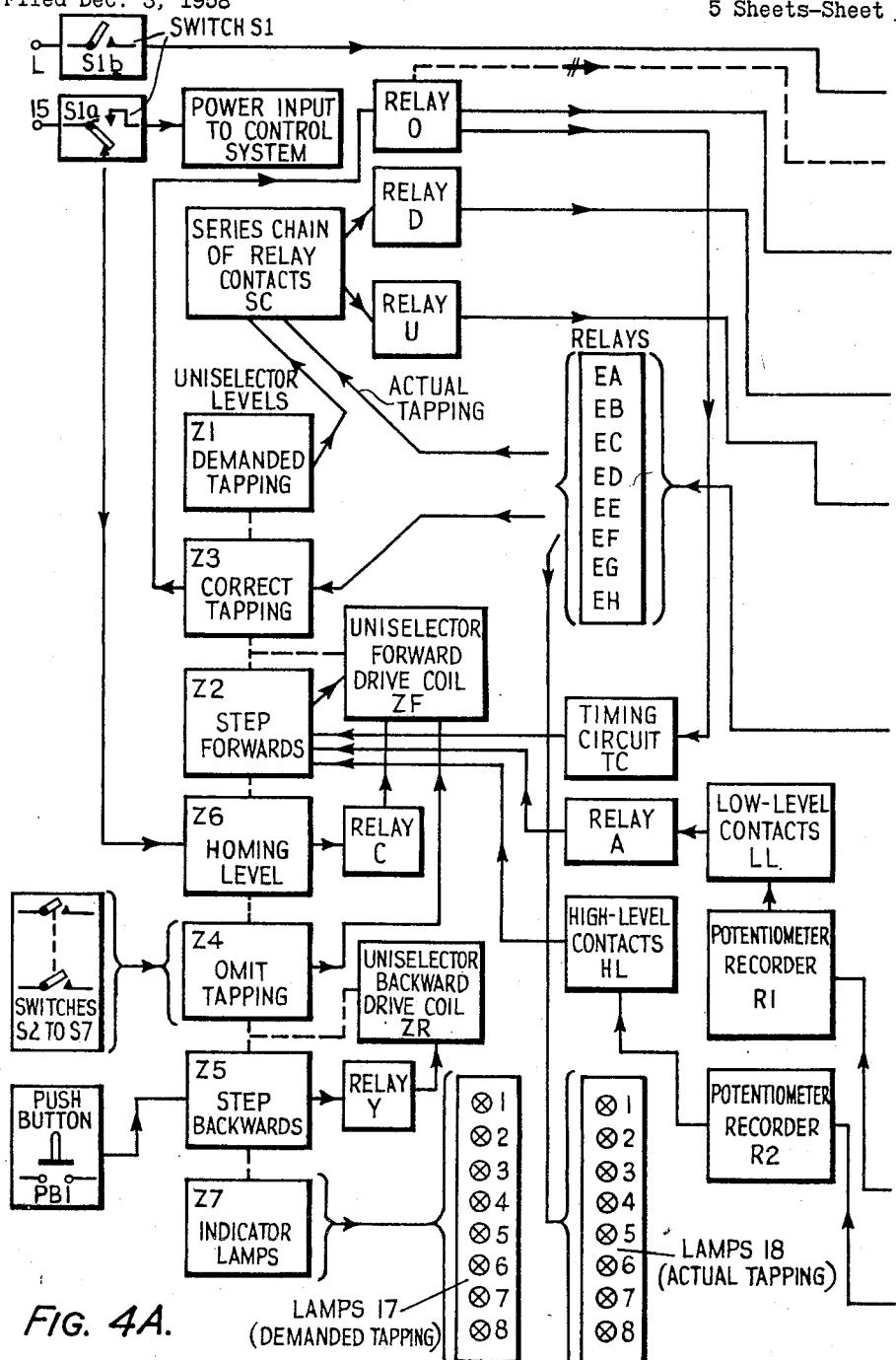
Figure 4B:
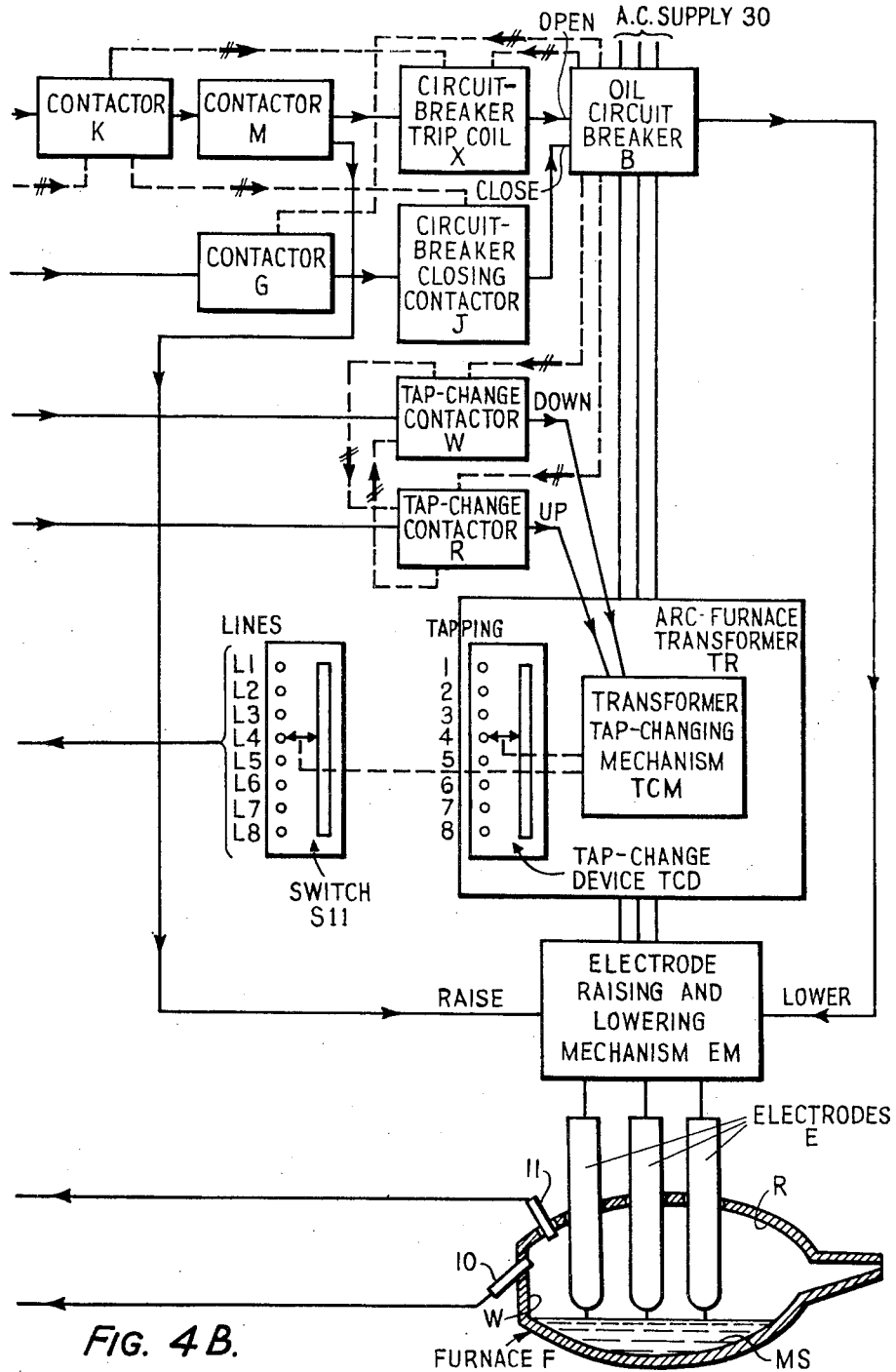

FIGURES 4A and 4B taken in conjunction show a block diagram of the complete control system.

In the furnace F (FIGURE 4) under consideration, the roof temperature increases during melting at a steady rate, until nearly all the charge is molten when the temperature of the roof begins to rise rapidly, since it is now exposed to direct radiation from the arcs, and the rate of temperature rise at this stage can be as high as 50° C. per minute. The power input is reduced at the end of the melting period and the temperature falls for a short time but as the refining period progresses the temperature rises and often reaches a maximum just before the furnace is tapped.

From roof temperature measurements made on this furnace it has been found that at the end of melting the temperature can be anywhere within the range of 1520° C.–1650° C. Even when the roof temperature is at the lower end of this range the bath temperature is reasonable so that the high power can be cut, as allowing the roof temperature to elevate to 1650° C. results in the waste of electricity, damage to the refractories and superheating of the molten charge.

After the power input has been reduced the true steel-making process begins; the arcs are then no longer shielded by the now molten scrap and the furnace refractories are therefore exposed to direct radiation and convection from the arcs. Consequently, the general temperature level of the refractories increases until for a given power input a steady state exists.

In order to control the furnace in the manner described above, there are provided two devices 10, 11 which are respectively sensitive to the temperature of the furnace roof or wall, and to the rate at which heat is received by the roof or wall, and which close contacts HL, LL respectively when the temperature and rate of heat received reach prescribed values. The temperature sensitive device 10 may consist of a thermocouple sheathed in a refractory tube located in the roof or wall, or a radiation pyrometer sighted through the furnace wall on to the roof. The device 11 sensitive to rate of heat reception may consist of a heat flow meter located preferably in the roof, or possibly at the top of the wall.

The two devices 10, 11 may be constituted by a single thermocouple or a radiation pyrometer provided that the usual potentiometric recorder controller associated with the thermocouple or pyrometer is fitted with auxiliary equipment responsive to rate of rise of the measured temperature. In this case, contacts LL may close when the rate of rise of temperature exceeds say 20° C. per minute for more than say 45 seconds.

Alternatively, two temperature sensitive devices or a single temperature sensitive device may be arranged to close contacts LL, HL when different temperature levels are reached, say 1100° C. and 1600° C. respectively. In this case, the low level contacts LL are arranged to close at a temperature at which experience has shown the rate of rise of temperature is reached.

In the example considered the furnace electrodes E (FIGURE 3) are supplied from A.C. supply lines 30 through a circuit breaker B and a transformer TR which has 8 voltage tappings. A switch S11 (FIGURE 2) is directly coupled to the tap changing mechanism and the positions are numbered 1 to 8. These tappings are selected successively in a predetermined order by a multi-position switch, or uniselector, the various levels of which are indicated at Z1, Z2 ... Z7; each time the switch moves to a new position, the control system is operated to change the tapping to a value determined by the new position. Movement of the uniselector from one position to a next is initiated by a timing circuit including a clock 12, which determines the period for which a particular voltage tap is operative, but in certain positions of the uniselector, the movement is caused by the before-mentioned contacts LL and HL.

The multi-position switch or uniselector can be driven in opposite directions by the coils ZF, ZR, a movement in the forward or backward direction being effected by pulsing coil ZF or ZR respectively.

The voltage tap in operation is indicated by the energisation of one of the eight relays EA, EB ... EH which are connected to the lines L1 to L8 respectively. (In the drawings, each relay or contactor is identified, for convenience and in a well-known manner, by a reference symbol in the form of a fraction the denominator of which denotes the number of sets of contacts associated with the relay in question. For example, the relay EA has four sets of contacts, and is therefore identified by the symbol $$\frac{EA}{4})$$

As shown in FIGURE 2, these lines L1 to L8 can be singly connected by the switch S11 to a supply line L. The slider of switch S11 is driven by the tap changing mechanism so that, for example, when the fourth tap is employed, line L4 is enerized and relay ED is operated.

Each of the relays EA to EH has a pair of contacts EA1, EA2; . . . EH1, EH2 connected in a series chain and the contacts of level Z1 are connected to the chain at points selected according to the voltage tap required at each successive period in the process. Thus, in the example tap 5 is required to initiate the melting period and therefore the first contact in level Z1 is connected between the contacts EE1, EE2 of the relay EE corresponding to tap 5.

In order to initiate the control cycle of the furnace, an A.C. supply is connected to the terminals 13, D.C. supply is connected between terminals 14, 15 and subsequently between terminals 14, 16, when a switch S1 having contacts S1a (FIG. 1A) and S1b (FIG. 2) is placed in the "on" position and contacts S1a close. The uniselector has its wiper in each level Z1 to Z7 on the first contact as shown. In level Z1 negative potential is applied to the wiper and thence to contacts EE1, EE2. The ends of the chain of contacts EA1 to EH2 are connected to relays D, U respectively. If relay EE is not energised, indicating that the fifth tap is not in use, one or other of relays D, U will be energised, depending on which of the relays EA to EH is operated causing the break in the chain of contacts EA1 to EH2. The operation of relays D or U causes tap changing until the fifth tap is reached and the first contact of level Z1 is isolated by opening of contacts EE1, EE2.

Since in the present example the last step of the programme involves energisation by use of the first voltage tapping of transformer TR, as indicated in level Z1, switch S11 will be engaged in the first tapping position when subsequently re-initiating the whole programme. On switching on therefore, relay EA in line 1 is energised so that contacts EA1 and EA2 of the chain of contacts EA1 to EH2 are open and the remainder of these contacts are closed by non-energisation of the associated relays EB to EH. Thus, a circuit is made from the negative terminal 15, through the wiper and first contact of uniselector level Z1, contacts EE2 to EH2, contacts D2, and relay U to positive terminal 14. Energisation of relay U causes its contacts U1 to close so that contactor R is energised (FIGURE 2). Contactor R, when energised, causes switch S11 to move upwards to effect tap changing through the second to fifth tap positions. With switch S11 selecting the second to fourth tap positions, it will be seen that the resultant opening of the associated pairs of contacts EB1 and EB2 to ED1 and ED2 does not interrupt the tap changing operation. However, when the fifth tap position is reached, relay EE in line L5 is energised to open contacts EE1 and EE2, and relay U, together with contactor R, is de-energised to terminate the upward tap changing by switch S11 at the desired tap position.

Clearly, if the switch S11 is initially in any other tap position between the first and fifth positions, a corresponding upward tap changing operation occurs to select the fifth tap position.

Also, it will be evident that, if the switch S11 is initially in any of the sixth to eighth tap positions, then on switching on the circuit made is from negative terminal 15, the wiper and first contact of uniselector lever Z1, contacts EE1 to EA1, contacts U2, and relay D, to positive terminal 14. In this case relay D is energised, its contacts D1 close and contactor W is thus energised to cause tap changing by switch S11 downwards to the fifth tap position. Again, when the latter tap position is reached relay EE operates to break the above circuits and de-energise relay D and contactor W.

It will be noted that when either one of relays U and D is energised the appropriate contacts U2 or D2 are opened to ensure that the other relay is not energised. Also selection of the desired tapping gives rise to energisation of the associated relay E to open a pair of contacts, in the above example EE1 and EE2, in the chain EA1 to EH2 such that no energisation of either relay U or D can occur again in that programme step regardless of which of these relays was energised to arrive at the desired tapping. Also when either one of contactors R and W is operated, non-operation of the other is ensured by opening of normally closed R1 or W1, as the case may be. When the fifth tap has been reached, the energisation of relay EE also closes contact EE3 which, as will be seen, is connected to the first contact in level Z3. Relay O is energised through a circuit from terminal 15, through contacts S1a, via contacts C3, ZFO, level Z3, contacts EE3, relay O to terminal 14.

On energisation of relay O, contacts O1 open to de-energise contactor K and close contacts K3. Also contacts O2 close to energise contactor G through the normally closed circuit breaker auxiliary contacts By, and so close contacts G1, whereby the oil circuit breaker closing contactor J is operated to close the breaker B to connect A.C. power supply to the electrodes E, and to drive the electrodes E down to the charge to start arcing by energisation of an electric motor drive or in any other suitable way.

Contacts O3 also close and operate the timing mechanism consisting of a solenoid T and a clock 12 which are simultaneously energised. Solenoid T when energised commences timing of the time period previously set on the dial of the clock. At the end of the time interval contacts T1 close and contacts T2 open. The closing of contacts T1 initiates the next step of the furnace cycle since it completes a circuit from terminal 14, through the wiper of level Z2, coil ZF, contacts T1, normally closed contacts $ZR_0$ and S1a to terminal 15. The uniselector is thus stepped on the second contact in each level, which in the first level Z1 is associated with a tap setting 6, by energisation of the forward drive coil ZF when the circuit just described is made by closure of contacts T1.

When the uniselector steps on to the second contact, the circuit at level Z3 through contacts EE3 to relay O is broken. The consequent de-energization of relay O resets the timing circuit by opening contacts O3 and therefore de-energising solenoid T. The closing of contacts O1 (FIGURE 2) causes the energisation of contactor K via switch contacts S1b across the A.C. supply lines L, N. The closing of contacts K1 causes the operation of the contactor M to energise an electric motor, or other suitable means, to raise the furnace electrodes E, and after a preset time interval within the range 0–30 seconds, (say 10 seconds) sufficient to enable the arcs to be broken by the raising of the electrodes, the contacts M1 close to energise the circuit breaker trip coil X, contacts K2 being already closed by energisation of contactor K above. The circuit breaker B opens and the supply to the furnace is cut off. When the circuit breaker releases, auxiliary contacts Bx open and de-energise coil X. The circuit is now ready for tap changing to the new tap selected by the second position of the uniselector.

In the second step, the wiper in level Z1 connects terminal 15 to the junction of contacts EF1, EF2 and, through contacts EF2—EH2 to relay U. Relay U is energised, contacts U1 close and contactor R is operated.

When tap 6 is reached, contact EF2 opens and deenergises relay U, preventing further tap changing. At the same time contacts EF3 close and cause, relay O to be energised. As a result, contactor G is re-energised, the breaker closing contactor J operates, the electrodes are driven down to the charge, and power is once more supplied through the oil circuit breaker B to the electrodes E and the timing circuit is restarted, as at the end of the initial tap-change.

At the end of the period set by the timing circuit, the uniselector is moved on to the third position, tap changing to tap 7 occurs and power is supplied to the electrodes at this tapping for the time period set by the timing circuit. At the end of this third step, the uniselector moves to its fourth position, and as before, selects tap 8, the timing circuit is once again put into operation but, unlike previous steps, the period on this tapping is determined not only by the timing circuit but also by the temperature of, or rate of heat flow to, the furnace roof or wall by virtue of the detector 11 and operation of contacts LL. Thus, at the end of the period determined by the timing circuit, contacts T1 close as before, but the energising circuit to coil ZF is not completed until contacts LL close and thereby energise relay A. However, if the high level contacts HL should close before contacts LL, the energizing circuit for coil ZF is immediately completed through contacts A3 and HL.

When the low level temperature responsive device operates and contacts LL close, relay A is energised and is held energised by contacts A1 for the remainder of the furnace cycle. Closing of contacts A2 completes the energising circuit for coil ZF from terminal 14, through the wiper of level Z2, the fourth contact in this level, contacts A2, coil ZF, contacts T1 (closed) and contacts $ZR_0$ to terminal 15.

When coil ZF is energised, the uniselector moves on to the fifth position, which corresponds to the seventh tapping. Tap changing in a downward direction occurs and, at each of the following three steps in the furnace cycle the tapping is reduced successively from 7 to 3, by the timing circuit.

The first four steps in the furnace cycle correspond to the initiation of the melting period during which the power is progressively increased. The next five steps correspond to the end of the melting period during which the power is progressively decreased. The following steps correspond to the refining period when, as explained above, the power is again decreased. During the ninth step, the period for which tapping 3 is employed is determined by the timing circuit in conjunction with the high level contacts HL. At the end of the period determined by the timing circuit, contacts T1 close, but unless contacts HL are closed the circuit to coil ZF is incomplete. As soon as the furnace temperature reaches the higher level, contacts HL close and coil ZF is energised through a circuit from terminal 14, the wiper of level Z2, the ninth contact in that level, contacts HL, coil ZF and contacts T1, $ZR_0$ to terminal 15. The uniselector therefore moves on to the tenth position and tap 2 is selected by the mechanism described above. Usually, the power stays at this tapping for the remainder of the refining period, but after contacts T1 have closed at the end of the time interval if the temperature should again reach the value at which contacts HL are closed, coil ZF will again be energised through the circuit described above to cause the uniselector to step on to the eleventh position and select the lowest tap 1 for the remainder of the operation.

At the conclusion of the furnace cycle, switch S1 is put into the "off" position by hand. Thus a circuit is made from negative terminal 15, through the wiper of uniselector level Z6 and the contact thereof engaged at that time, namely the eleventh contact, and relay C to positive terminal 14. Thus, contacts C1 and C2 close, and contacts C3 change from the positions shown. As a result of relay C energisation, a circuit is made from negative terminal 15, through uniselector level Z6, contacts C3, contacts $ZF_0$, contacts C1, coil ZF, and contacts C2 to positive terminal 14. Coil ZF is therefore energised to drive the wipers of uniselector Z forward until they home on the first contacts, relay C then being de-energised since the uniselector level Z6 breaks the above homing circuit in this position.

The operation of the control system is indicated by two sets of lamps 17, 18 which are numbered corresponding to the voltage tap to which they refer. Lamps 17 are connected to the successive contacts in level Z7 in a code selected so that, in each step, the lamp selected corresponds to the desired tap on that step. The second series of lamps 18 are individually connected through contacts EA4 to EH4 and therefore are illuminated according to the actual tap in use. When the lamps in the two series 17, 18 correspond, the operator knows that tap changing has been properly effected.

The programme preselected by the coding of the contacts in level Z1 may be modified by operation of switches S2 to S7 which are connected to selected contacts of level Z4. By appropriately operating these switches, the timing circuit contacts T1 in series with coil ZF may be short circuited and stepping of the uniselector may be initiated prior to the end of the period set by the timing circuit. Thus, for example, if the uniselector is on the second contact, the closing of switch S2 completes a circuit to coil ZF from terminal 15, contacts C3, contacts $ZF_0$, the wiper of level Z4, switch S2, coil ZF, the wiper of level Z2, to terminal 14, and the uniselector moves forward one step. Simultaneous operation of switches S2, S3 causes the system to jump to the fourth step. This facility can be used at the start and/or the end of melting so that certain voltage taps can be jumped, as desired.

Occasionally it is required to provide extra power during the refining period in order to melt the second slag, or for other purposes. This may be done by operating the push button PB1 and thereby causing the uniselector to step backwardly, e.g. from the tenth position corresponding to tap 2 to the ninth position corresponding to tap 3. When button PB1 is pressed, normally open contacts 19 are bridged and the left hand coil 20 of a relay Y is energised. A hold circuit is completed through contacts Y1 and contacts Y2 are closed to prepare a circuit for the relay coil 21 of relay Y. As button PB1 is released, normally closed contacts 22 are bridged, thereby energising coil 21 in opposition to coil 20, and de-energising relay Y. While coil 20 of relay Y remains energised, coil ZR is energised through a circuit from terminal 15, through contacts C3, the wiper of level Z5, contacts Y3 (closed), coil ZR to terminal 14. Pulsing of coil ZR has the effect of stepping backwardly the uniselector.

What is claimed is:

1. An automatic control system for an electric arc melting furnace having electrodes connectable to a power supply, comprising means for adjusting the electrical power input to the furnace electrodes from the power supply, programme means to automatically control the power input adjustment means in predetermined stepwise sequence, and a timing device to predetermine the minimum duration of programme steps during normal operation of the furnace, and means responsive to a temperature characteristic of the furnace for automatically extending the duration of at least one of the programme steps beyond the minimum duration determined by the timing device.

2. A control system as claimed in claim 1, in which the control means includes a tapped electrical circuit element of the kind provided with N tappings (where N is an integer not less than two) and with connecting means for making an electrical connection to any one of the tappings at a time, a tap-changing mechanism for adjusting said connecting means from connection with any one tapping to connection with any other, N pairs of normally closed electrical contacts, the pairs of contacts being respectively associated with the tappings and being arranged so that when a given tapping is in use each of the associated pair of contacts is opened, the two contacts of each pair being connected together in series so as to have a common terminal, and the pairs of series-connected contacts being connected together in a series chain and in the same sequence as that of the associated tappings, opposite ends of the series chain being respectively connected to two driving means respectively electrically energizable to drive the tap-changing mechanism in relatively opposite directions, the control means including also selective switching means arranged to electrically energize any one at a time of the common terminals and to energize the driving means connected to that part of said series chain having no open contacts.

3. A control system as claimed in claim 2, in which the control means includes an auxiliary electrical switch having N terminals together with contacting means for making an electrical connection to any one of those terminals at a time, the N terminals being respectively associated with the N tappings, the contacting means being driven by the tap-changing mechanism in synchronism with the connecting means such that the contacting means and the connecting means always respectively make electrical connections with corresponding terminals and tappings, and which includes N relays the windings of which are respectively connected to the N terminals, the said N pairs of contacts being respectively pairs of contacts of the N relays, and which further includes a source of energization connected to said contacting means to effect energization of that one of the N relays which is associated with the terminal to which the contacting means make an electrical connection at any time.

4. A control system as claimed in claim 1, in which the furnace has a refractory lining, comprising a heat-sensitive device responsive to a temperature characteristic of the refractory lining, and means controlled by the heat-sensitive device to determine the duration of at least one programme step, whereby the duration of a programme step subject to heat-sensitive device control can be extended beyond the minimum period determined by said timing device.

5. A control system as claimed in claim 1, in which the furnace is intended for the melting and subsequent refining of a substance, comprising a group of programme steps towards the end of the melting period to automatically progressively decrease the power input to the furnace electrodes in successive steps of the group of programme steps.

6. A control system as claimed in claim 1, in which the furnace is intended for the melting and subsequent refining of a substance, comprising a group of programme steps at the initiation of the melting period to automatically progressively increase the power supply to the furnace electrodes in successive steps of the group of programme steps.

7. A control system as claimed in claim 1, in which the furnace has a refractory lining and is intended for the melting and subsequent refining of a substance, comprising means responsive to a temperature characteristic of the furnace lining to control the programme means to prevent that temperature characteristic exceeding a predetermined maximum value.

8. A control system for an electric arc melting furnace having electrodes connectable to a power supply, comprising means for adjusting the electrical power input to the furnace electrodes from the power supply to obtain in different positions different discrete values of power input, switch means having a sequence of operative positions, means for associating successive operative positions of the switch means with selected positions of the power input adjustment means, means for automatically operating the switch means to adopt successive ones of its operative positions in stepwise manner, means for controlling the power input adjustment means in accordance with the operative position of the switch means during successive steps thereof to adjust the power input to the discrete values associated with such steps, and a timing device to control the switch operating means to predetermine minimum time intervals between successive steps of the switch during normal operation of the furnace.

9. A control system as claimed in claim 8, in which the furnace has a refractory lining, comprising a heat-sensitive device responsive to a temperature characteristic of the furnace lining, and delay means controlled by the heat-sensitive device to delay operation of the switch operating means after at least one predetermined operation thereof to extend the predetermined minimum time interval before the next operation of the switch operating means in accordance with the furnace lining temperature characteristic.

10. A control system as claimed in claim 9, wherein said heat-sensitive device is responsive to the temperature of the furnace lining.

11. A control system as claimed in claim 9, wherein said heat-sensitive device is responsive to the rate at which heat is received by the furnace lining.

12. A control system as claimed in claim 9, in which the furnace is intended for the melting and subsequent refining of a substance, wherein a first group of operative positions of the switch representing control steps during initiation of the melting period are associated with progressively increasing discrete power input values, and a second group of operative positions of the switch representing control steps towards the end of the melting period are associated with progressively decreasing discrete power input values.

13. A control system as claimed in claim 8, comprising auxiliary means for operating the switch means in stepwise manner in the reverse direction to that effected by said automatic switch operating means.

14. A control system as claimed in claim 13, in which said auxiliary means is operable only when the switch means is in predetermined operative positions.

15. A control system as claimed in claim 8, in which the switch means comprises a uniselector.

16. A control system as claimed in claim 8, comprising means for effecting additional operations in respect of the furnace electrodes before and after adjustment of the power input thereto subsequent to each change of operative position of the switch means involving adjustment of power input.

17. A control system as claimed in claim 8, comprising means for automatically operating said switch means to adopt the first operative position of the sequence of such positions after completion of the power input adjustment steps thereof.

18. For an electric arc furnace having electrodes connectable to a power supply and having a refractory lining and intended for the melting and subsequent refining of a substance, an automatic control system comprising means for adjusting the electrical power input to the furnace electrodes from the power supply, programme means to automatically control the power input adjustment means in a predetermined sequence of programme steps, a timing device to predetermine the minimum duration of the programme steps during normal operation of the furnace, and a heat sensitive device sensitive to a temperature characteristic of the refractory lining of the furnace, said programme steps comprising a group of steps at the initiation of the melting period to automatically progressively increase the power supply to the furnace electrodes until the heat sensitive device indicates that the temperature characteristic of the refractory lining has reached a first predetermined value, and a further group of programme steps towards the end of the melting period to automatically progressively decrease the power input to the furnace electrodes until the heat sensitive device indicates that the temperature characteristic of the refractory lining has reached a second predetermined value.

References Cited in the file of this patent

UNITED STATES PATENTS

| | | |
|---|---|---|
| 1,683,856 | Bailey | Sept. 11, 1928 |
| 2,890,368 | Boron et al. | June 9, 1959 |